United States Patent Office 3,415,845
Patented Dec. 10, 1968

3,415,845
19-NOR-A-HOMO-PREGNANE DERIVATIVES
Lawrence H. Knox, Mexico City, Mexico, assignor to Syntex Corporation, Panama, Panama, a corporation of Panama
No Drawing. Filed Feb. 4, 1965, Ser. No. 430,469
8 Claims. (Cl. 260—340.5)

ABSTRACT OF THE DISCLOSURE

Novel 3 - keto-$\Delta^{1,4(4a),5(10)}$-19-nor-A-homo-pregnatriene derivatives having progestational, anti-inflammatory, anti-gonadotrophic, anti-estrogenic, anti-androgenic, thymolytic and glycogenic properties.

---

The present invention relates to novel cyclopentanophenanthrene derivatives and to a process for the production thereof.

More particularly the present invention relates to novel $\Delta^{1,4(4a),5(10)}$-19-nor-A-homo-pregnatrien-3-one derivatives.

The novel compounds of the present invention are represented by the following formulae:

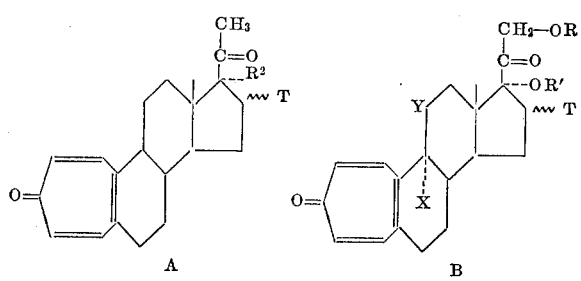

In the above formulae R represents hydrogen or a hydrocarbon carboxylic acyl group of less than 12 carbon atoms; $R^1$ represents hydrogen; $R^2$ represents hydrogen, hydroxyl or a hydrocarbon carboxylic acyloxy group of less than 12 carbon atoms; T represents hydrogen or methyl, the latter preferably at the α-position in Formula B; $R^2$ and T together and —$OR^1$ and T together represent a 16α,17α-lower alkylidenedioxy grouping; X is hydrogen, fluorine or chlorine; and Y represents β-hydroxyl or keto.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by Formula A are progestational agents with oral activity. In addition they have anti-androgenic, anti-gonadotrophic, and anti-estrogenic properties and are useful in fertility control. Furthermore, they may be used in the treatment of premenstrual tension and exhibit blood cholesterol lowering and diuretic activities.

The compounds represented by Formula B are cortical hormones with anti-inflammatory, low catabolic, glycogenic and thymolytic activities. In addition, they are anti-androgenic, anti-gonadotrophic and anti-estrogenic hormones. Furthermore, they have topical activity in skin disorders such as psoriasis, allergic dermatitis and the like.

The novel compounds of the present invention are exemplified as follows:

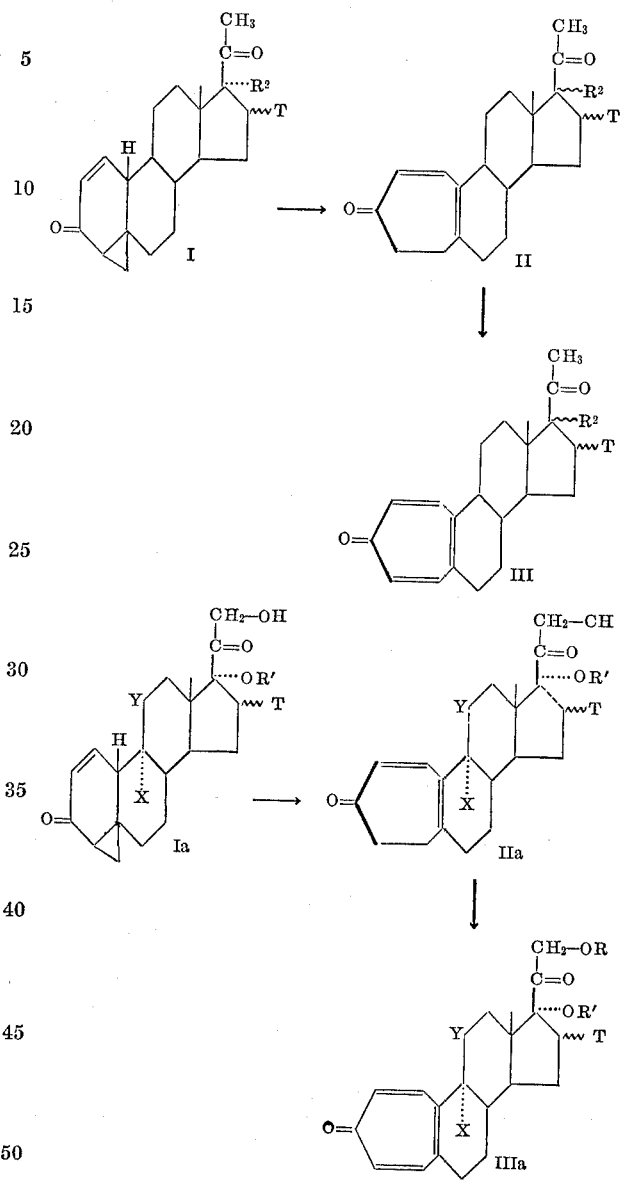

In the above formulae R, $R^1$, $R^2$, T, X and Y have the same meaning as set forth hereinabove.

In proceeding in accordance with the above equation, the starting compounds which may be of the type (I) i.e., a 4β,5β-methylene-$\Delta^1$-19-nor-pregnene-3,20-dione or of the type (Ia) that is a 4β,5β-methylene-$\Delta^1$-19-nor-pregnene-17α,21-diol-3,20-dione derivative having a β-hydroxyl group or a ketonic oxygen at C-11, is treated with an alkali metal terbutoxide, in a suitable solvent preferably in t-butanol for a period of time of about 2 to 6 hours, at a temperature which may range between room temperature and the reflux temperature of the mixture, thus affording the corresponding $\Delta^{1,5(10)}$-19-nor-A-homo-pregnadiene-3,20-dione derivative (II or IIa), which upon dehydrogenation with conventional dehydrogenating agents such as 2,3-dichloro-5,6-dicyano-1,4-benzoquinone, selenium dioxide, and the like, under conventional dehydrogenating conditions affords the corresponding $\Delta^{1,4(4a),5(10)}$ - 19-nor - pregnatriene-3,20 - dione derivatives (III or IIIa).

The compounds of the present invention having a primary hydroxyl group, for example at C-21, are conventionally acylated in pyridine with an acylating agent, such as an anhydride or a chloride, of a hydrocarbon carboxylic acid of the type described hereinbefore, to give the corresponding acylates.

The compounds of the present invention having in the molecule a tertiary hydroxyl group, e.g., at C-17 are conventionally esterified in the presence of p-toluene sulfonic acid with an acylating agent, such as acetic anhydride, caproic anhydride, cyclopentylpropionic anhydride or enanthic anhydride, to produce the corresponding esters.

The starting compounds of the present invention were prepared according to my copending U.S. patent application, Ser. No. 430,463 filed of even date herewith, and now abandoned by treating the corresponding 5β-chloromethyl-Δ¹-3-keto-19-nor-pregnene derivative with sodium ethoxide, to give the corresponding 4β,5β-methylene-Δ¹-3-keto-19-nor-pregnene compound.

The following specific examples serve to illustrate but are not intended to limit the scope of the present invention:

Example I

A solution of 1 g. of 4β,5β-methylene-Δ¹-19-nor-pregnene-3,20-dione in 50 cc. of t-butanol was treated with a solution of 250 mg. of sodium in 25 cc. of t-butanol. The resulting mixture was kept at room temperature for 6 hours, then it was neutralized with acetic acid, diluted with water and extracted with methylene chloride. The organic extract was dried over anhydrous sodium sulfate and evaporated to dryness. Upon crystallization from methanol there was obtained Δ¹,⁵⁽¹⁰⁾-A-homo-19-nor-pregnadiene-3,20-dione (Compound No. 1).

A mixture of 500 mg. of Compound No. 1, 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off and the filtrate evaporated to dryness. The residue was dissolved in acetone and filtered through 10 g. of alumina. Crystallization from acetone-hexane gave Δ¹,⁴⁽⁴ᵃ⁾,⁵⁽¹⁰⁾-19-nor-A-homo-pregnatriene-3,20-dione (Compound No. 2).

The starting compounds listed hereinafter under I were treated by the above procedures, thus furnishing firstly the corresponding Δ¹,⁵⁽¹⁰⁾-19-nor-pregnadiene derivatives and finally the corresponding products set forth under II:

| Compound No. | I | II |
|---|---|---|
| 3 | 4β, 5β-methylene-16α-methyl-Δ¹-19-nor-pregnene-3, 20-dione. | 16α-methyl-Δ¹,⁴⁽⁴ᵃ⁾,⁵⁽¹⁰⁾-19-nor-A-homo-pregnatriene-3, 20-dione. |
| 4 | 4β, 5β-methylene-16β-methyl-Δ¹-19-nor-3, 20-dione. | 16β-methyl-Δ¹,⁴⁽⁴ᵃ⁾,⁵⁽¹⁰⁾-19-nor-A-homo-pregnatriene-3, 20-dione. |
| 5 | 4β, 5β-methylene-16α, isopropylidenedioxy-Δ¹-19-nor-pregnene-3, 20-dione. | 16α, 17α-isopropylidenedioxy-Δ¹,⁴⁽⁴ᵃ⁾,⁵⁽¹⁰⁾-19-nor-A-homo-pregnatriene-3, 20-dione. |
| 6 | 4β, 5β-methylene-Δ¹-19-nor-pregnen-17α-ol-3, 20-dione acetate. | Δ¹,⁴⁽⁴ᵃ⁾,⁵⁽¹⁰⁾-19-nor-A-homo-pregnatrien-17α-ol-3, 20-dione acetate. |
| 7 | 4β, 5β-methylene-16α-methyl-Δ¹-19-nor-pregnen-17α-ol-3, 20-dione. | 16α-methyl-Δ¹,⁴⁽⁴ᵃ⁾,⁵⁽¹⁰⁾-19-nor-A-homo-pregnatrien-17α-ol-3, 20-dione. |
| 8 | 4β, 5β-methylene-16α-methyl-Δ¹-19-nor-pregnene-11β,17α, 21-triol-3, 20-dione. | 16α-methyl-Δ¹,⁴⁽⁴ᵃ⁾,⁵⁽¹⁰⁾-19-nor-A-homo-pregnatriene-11β, 17α, 21-triol-3, 20-dione. |
| 9 | 4β, 5β-methylene-16α-methyl-Δ¹-19-nor-pregnene-17α, 21-diol-3, 11, 20-trione. | 16α-methyl-Δ¹,⁴⁽⁴ᵃ⁾,⁵⁽¹⁰⁾-19-nor-A-homo-pregnatriene-17α, 21-diol-3, 11, 20-trione. |
| 10 | 4β, 5β-methylene-Δ¹-19-nor-pregnene-11β, 17α, 21-triol-3, 20-dione. | Δ¹,⁴⁽⁴ᵃ⁾,⁵⁽¹⁰⁾-19-nor-A-homo-pregnatriene-11β, 17α, 21-triol-3, 20-dione. |
| 11 | 4β, 5β-methylene-Δ¹-19-nor-pregnene-17α, 21-diol-3, 11, 20-trione. | Δ¹,⁴⁽⁴ᵃ⁾,⁵⁽¹⁰⁾-19-nor-A-homo-pregnatriene-17α, 21-diol-3, 11, 20-trione. |
| 12 | 4β, 5β-methylene-9α-fluoro-Δ¹-19-nor-pregnene-11β, 17α, 21-triol-3, 20-dione. | 9α-fluoro-Δ¹,⁴⁽⁴ᵃ⁾,⁵⁽¹⁰⁾-19-nor-A-homo-pregnatriene-11β, 17α, 21-triol-3, 20-dione. |
| 13 | 4β, 5β-methylene-16α-19-fluoro-Δ¹-19-nor-pregnene-11β, 17α, 21-triol-3, 20-dione. | 16α-methyl-19-fluoro-Δ¹,⁴⁽⁴ᵃ⁾,⁵⁽¹⁰⁾-19-nor-A-homo-pregnatriene-11β, 17α, 21-triol-3, 20-dione. |
| 14 | 4β, 5β-methylene-16α-methyl-19-chloro-Δ¹-19-nor-pregnene-11β, 17α, 21-triol-3, 20-dione. | 16α-methyl-19-chloro-Δ¹,⁴⁽⁴ᵃ⁾,⁵⁽¹⁰⁾-19-nor-A-homo-pregnatriene-11β, 17α, 21-triol-3, 20-dione. |
| 15 | 4β, 5β-methylene-16α-methyl-19-chloro-Δ¹-19-nor-pregnene-17α, 21-diol-3, 11, 20-trione. | 16α-methyl-19-chloro-A-homo-Δ¹,⁴⁽⁴ᵃ⁾,⁵⁽¹⁰⁾-19-nor-pregnatriene-17α, 21-diol-3, 11, 20-trione. |
| 16 | 4β, 5β-methylene-16α, 17α-isopropylidenedioxy-Δ¹-19-nor-pregnene-11β, 21-diol-3, 20-dione. | 16α,17α-isopropylidenedioxy-Δ¹,⁴⁽⁴ᵃ⁾,⁵⁽¹⁰⁾-19-nor-A-homo-pregnatriene-11β, 21-diol-3, 20-dione. |
| 17 | 4β, 5β-methylene-16α, 17α-isopropylidenedioxy-9α-fluoro-Δ¹-19-nor-pregnene-11β, 21-diol-3, 20-dione. | 16α,17α-isopropylidenedioxy-9α-fluoro-Δ¹,⁴⁽⁴ᵃ⁾,⁵⁽¹⁰⁾-19-nor-A-homo-pregnatriene-11β, 21-diol-3, 20-dione. |

Example II

The first part of the procedure of Example I was repeated, except that the reaction was carried out at reflux temperature for a period of time of 2 hours, thus affording the same results.

Example III

The first part of the procedure of Example I was repeated exactly, except that instead of using sodium there was used potassium, thus affording exactly the same final compound.

Example IV

A mixture of 1 g. of Compound No. 8, 4 cc. of pyridine and 2 cc. of acetic anhydride was kept at room temperature overnight, poured into ice water, the formed precipitate was filtered, washed with water and dried. Crystallization from acetone-hexane gave the 21-acetate of 16α-methyl-Δ¹,⁴⁽⁴ᵃ⁾,⁵⁽¹⁰⁾-19-nor - A - homo-pregnatriene-11β,17α,21-triol-3,20-dione (Compound No. 18).

The Compounds Nos. 9 to 17 were treated exactly by the same procedure, thus giving the corresponding 21-acetates.

Example V

The starting compounds of Example IV were treated by the procedure of said example, except that acetic anhydride was substituted by caproic anhydride, enanthic anhydride, and cyclopentylpropionic anhydride, thus affording respectively the corresponding caproates, enanthates and cyclopentylpropionates.

Example VI

To a solution of 5 g. of Compound No. 7 in 100 cc. of anhydrous benzene there were added 1 g. of p-toluenesulfonic acid and 10 cc. of caproic anhydride and the mixture was allowed to stand for 24 hours at room temperature, poured into ice and water and the resulting mixture stirred to effect hydrolysis of the excess anhydride. The benzene layer was separated and washed with 10% sodium carbonate solution and water. Drying, evaporation and crystallization of the residue from ether-hexane produced the acetate of 16α-methyl-Δ¹,⁴⁽⁴ᵃ⁾,⁵⁽¹⁰⁾-19-nor - A - homo-pregnatrien-17α-ol-3,20-dione (Compound No. 19).

Compound No. 7 was treated exactly by the procedure just described, except that caproic anhydride was substituted by acetic anhydride, propionic anhydride, cyclopentylpropionic anhydride and enanthic anhydride, thus affording respectively the acetate, propionate, cyclopentylpropionate, and enanthate.

I claim:
1. A compound of the following formula:

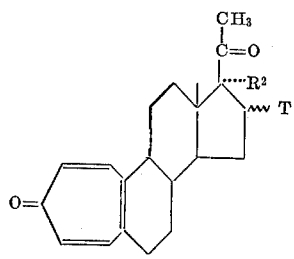

wherein R² is selected from the group consisting of hydrogen, hydroxyl, and a hydrocarbon carboxylic acyloxy group of less than 12 carbon atoms; T is a member of the group consisting of hydrogen and methyl and R² and T together form a 16α,17α-lower alkylidenedioxy grouping.

2. $\Delta^{1,4(4a),5(10)}$-19-nor-pregnatriene-3,20-dione.
3. 16α-methyl-$\Delta^{1,4(4a),5(10)}$-19-nor-A-homo-pregnatriene-3,20-dione.
4. 16β-methyl-$\Delta^{1,4(4a),5(10)}$-19-nor-A-homo-pregnatriene-3,20-dione.
5. 16α,17α-isopropylidenedioxy-$\Delta^{1,4(4a),5(10)}$-19-nor - A-homo-pregnatriene-3,20-dione.
6. $\Delta^{1,4(4a),5(10)}$-19-nor-A-homo-pregnatrien-17α-ol-3,20-dione acetate.
7. 16α-methyl-$\Delta^{1,4(4a),5(10)}$-19-nor-A-homo-pregnatrien-17α-ol-3,20-dione.
8. A process for the production of a $\Delta^{1,4(4a),5(10)}$-19-nor-A-homo-pregnatrien-3-one which comprises treating the corresponding 4β,5β-methylene-$\Delta^1$-19-nor-pregnen-3 - one with an alkali metal terbutoxide followed by dehydrogenation of the thus obtained $\Delta^{1,5(10)}$-19-nor-A-homo-pregnadien-3-one.

References Cited

FOREIGN PATENTS 643,803   2/1963   Belgium.

NICHOLAS S. RIZZO, *Primary Examiner.*

J. H. TURNIPSEED, *Assistant Examiner.*

U.S. Cl. X.R.

167—65; 260—397.1, 473, 476, 482, 483, 487, 488, 586